Figure 4:
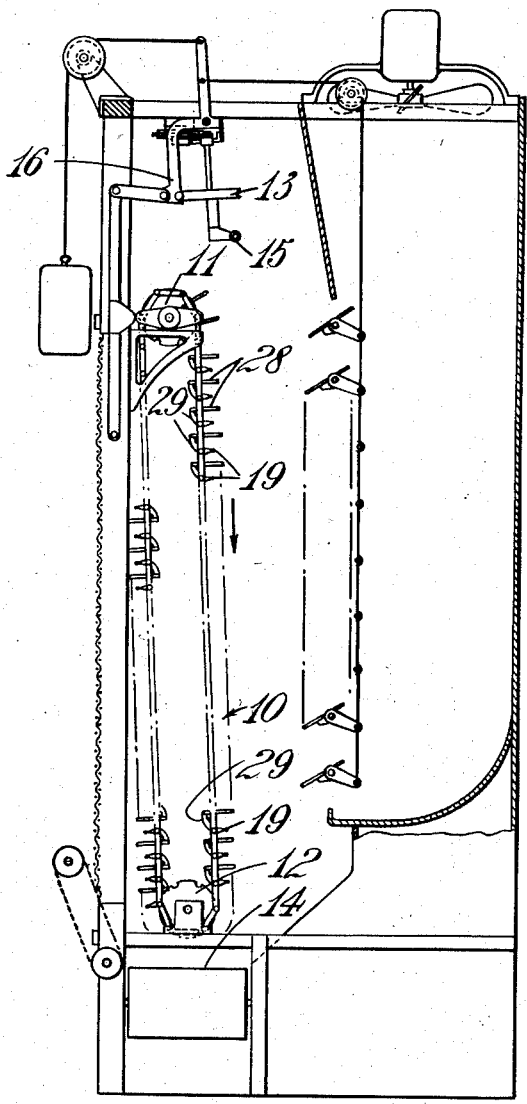

Aug. 6, 1957  G. A. HINDS  2,801,635
HOP PLUCKING APPARATUS
Filed Aug. 9, 1954  3 Sheets—Sheet 1
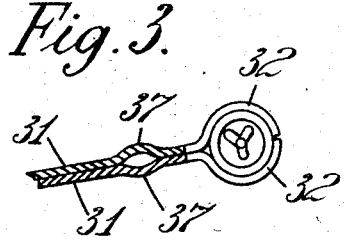
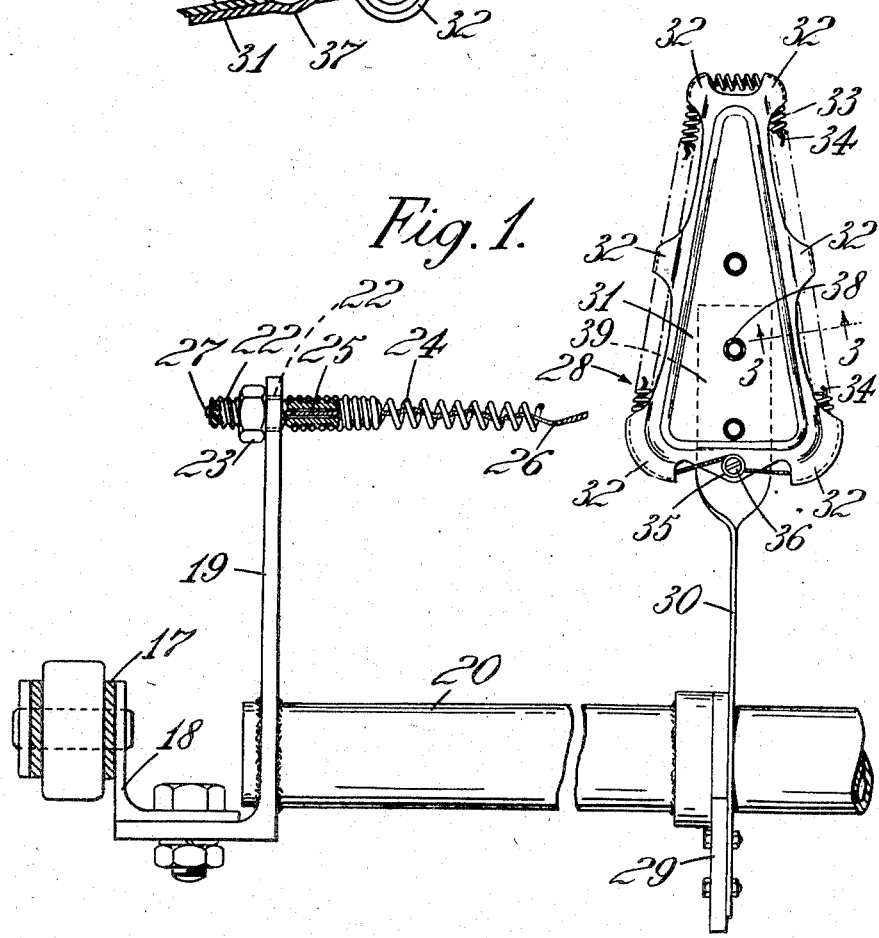

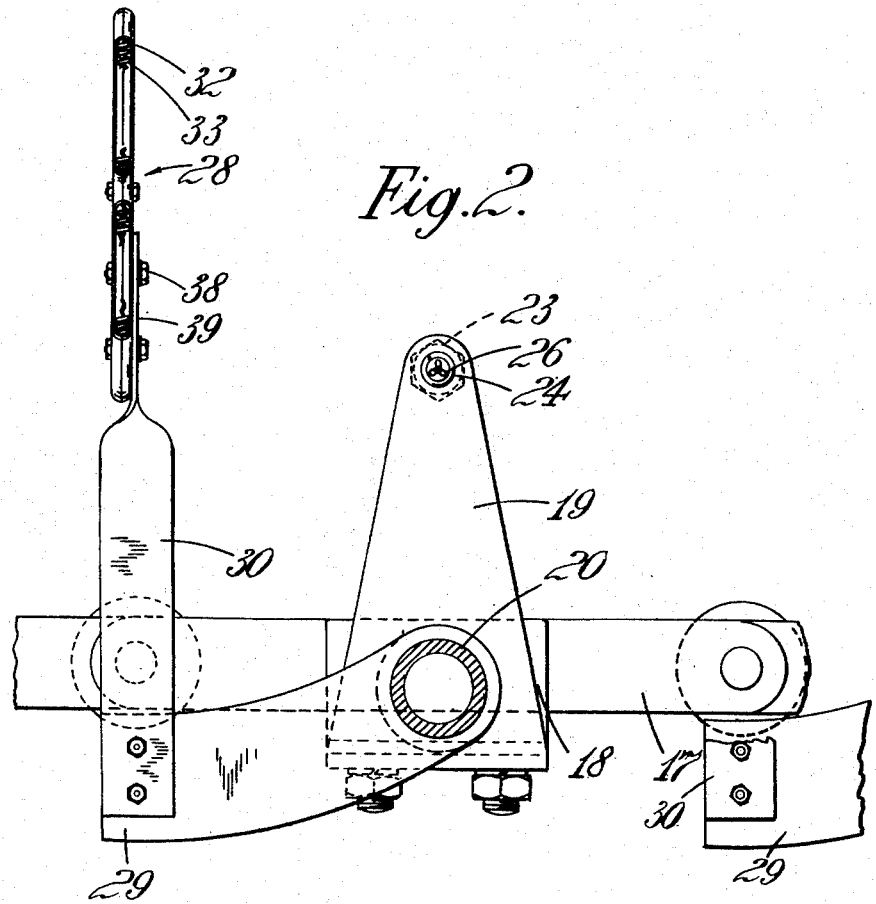

Aug. 6, 1957  G. A. HINDS  2,801,635
HOP PLUCKING APPARATUS
Filed Aug. 9, 1954  3 Sheets-Sheet 3

United States Patent Office 2,801,635
Patented Aug. 6, 1957

2,801,635

HOP PLUCKING APPARATUS

George Arthur Hinds, Malvern, England, assignor to George Hinds Limited, Malvern, England, a British company Application August 9, 1954, Serial No. 448,477

Claims priority, application Great Britain August 11, 1953

6 Claims. (Cl. 130—30)

This invention relates to hop plucking apparatus, of the kind embodying a comblike plucker for example an apparatus in which there are mounted on the frame of the apparatus means for holding the hop plant, and comblike pluckers and means for effecting relative movement between the holders and pluckers whereby the stalks of the hop flowers are drawn through the gaps in the comblike pluckers resulting in the hop flowers being plucked from the bine.

An object of the present invention is to provide an apparatus which is not only capable of plucking hop flowers from detached laterals but also from laterals still attached to the main bine.

A further object of the invention is to simplify and cheapen the manufacture of the holding means and pluckers.

According to this invention a hop plucking apparatus of the kind referred to, is characterised in that the holding means and/or comblike pluckers comprise a helical element attached to a support, the pitch of the helix being selected in accordance with the particular part of the hop plant which is to be accommodated in the spaces between the convolutions of the helix. Thus in the case of the comblike plucker, the spacing between the convolutions are such as to permit the entry of the stalks of the hop flowers but not the stems of the bine to which the stalks are attached. In the case of the holding means, the spacing apart of the convolutions are such as to enable the laterals to be gripped. The helical element may comprise a conventional helical tension spring.

The invention is particularly applicable to a hop plucking apparatus such as described in British patent specification No. 449,535, in which case the notched elements constituting the main pluckers may each be replaced by a helical element arranged with its axis straight and horizontal, whereas the subsidiary pluckers which extend horizontally at right angles to the main pluckers and which are notched along their edges, may be replaced by supports of a similar contour as those shown in the earlier specification around the margin of which is secured a helical element which is bent into a shape to correspond with said contour. The supports may for example, be tapered.

The helical element may be formed from spring wire so that by suitably tensioning the helix the required spacing between the convolutions is obtained.

As in the construction of specification No. 449,535 the main and auxiliary pluckers may be mounted on endless chains carried by sprockets so that the straight stretches of the chains move in an up and down direction with the main helical pluckers extending across the chains, and auxiliary pluckers projecting at right angles from them. It will be appreciated however the endless chains may be so mounted as to extend horizontally or in a direction inclined to the horizontal.

In the construction of earlier specification No. 449,535 each of the up-ended bines is supported by hooks, which hooks according to the present invention may be replaced by a horizontally disposed helix, of a larger diameter than the previously mentioned helixes and formed from stouter wire, which helix may be stretched so as to accommodate the stem of the bine between adjacent convolutions, which helix is then released so as to grip the bines. A number of bines can thus be gripped along the length of the helix and as in the earlier arrangements, means may be provided for imparting lateral movement of the helix across the endless chains supporting the main and auxiliary pluckers at the same time swinging the bine towards and away from the pluckers.

The following is a description of one form of hop plucking apparatus according to the invention reference being made to the accompanying drawings in which:

Figure 1 is a plan of a part of the plucker conveyor showing one of the driving chains, Figure 2 is a part side elevation and part section of the arrangement shown in Figure 1, and Figure 3 is a section on the line 3—3 through the plucking fingers shown in Figure 1, and Figure 4 is a side elevation of the apparatus.

The general arrangement of the hop plucking apparatus is similar to that described in British patent specification No. 449,535, and comprises a plucker conveyor 10 in the form of two endless chains passing around upper and lower sprockets 11 and 12, an overhead plant conveyor 13 and a lower conveyor 14 for carrying away the plucked hops. The overhead plant conveyor is provided with a helical wire 15 from which the hopbine is suspended and the conveyor is arranged to traverse the bine across the plucker conveyor 10. At the same time the oscillating mechanism 16 is arranged to swing the bines towards and away from the plucker conveyor. Referring now to the drawing certain of the links 17 on each of the endless chains of the plucker conveyor has secured thereto or formed thereon an angle bracket 18 and fixed to each angle bracket is a forwardly extending support or arm 19. Each support 19 on one of the chains is braced to a support on the other endless chain by a stay tube or cross bar 20. Each support is provided near its outer end with a threaded hole 21 which receives a screw threaded stud 22 which is provided with a lock nut 23. A helical tension spring 24 is initially formed so that the convolutions at its ends are closely adjacent or touching one another and these ends of the springs are arranged to be engaged with the screw threaded studs 22 carried by the supports 19 on opposite sides of the conveyor. Each of the studs is provided with a hole 25 extending axially through it and a crimped stranded steel wire 26 is arranged to extend through the two oppositely disposed studs and heads 27 are formed on the ends of the wire so as to anchor them to the studs. The purpose of the steel wire is to prevent the tension springs 24 from being unduly stretched. The studs are initially adjusted so that the required spacing between the convolutions of the springs is obtained and so that the laterals on the bine may pass between adjacent convolutions. In practice it is found that a suitable spring is one having an external diameter of about .25 inch and gaps between the convolutions of about .058 inch.

As in the construction of specification No. 449,535 a number of clamping fingers 28 are disposed apart across the width of the plucking conveyor between adjacent tension springs 24. For this purpose there are secured between adjacent stays 20 bearers 29 having secured thereto flexible strips or arms 30 on which the plucking fingers 28 are clamped by screws 38.

Each plucking finger is formed from two similarly shaped plates 31, arranged face to face and which are approximately triangular in configuration. Each plate is provided with a number of lugs 32 so as to provide a number of pairs of lugs which are bent into cylindrical formation and form a clip for another helical tension spring 33 which extends around the periphery of the plates, the ends of the spring being clamped between the two pairs of lugs 32 at the base of the triangle. Extending through the spring is another crimped steel stranded wire 34 the ends of which are clamped between a washer 35 and one of the plates 31 and are held in position by a set screw 36. Each plate 31 is pressed to provide a hollow rib 37. The two plates are held together by clamping screws 38 which may also serve to secure the finger to the end 39 of the flexible strip 30.

Instead of the bines being supported by hooks as shown in the specification No. 449,535 these hooks are replaced by a horizontally disposed helix of a larger diameter than previously mentioned form an outer wire, for example, a suitable helix for the purpose is one having an end cylinder diameter of 1.5" and formed from .190" gauge wire.

The helix is stretched so as to accommodate the stems of the bine between adjacent convolutions and which helix is then released to grip the bine. A number of bines can thus be gripped along the length of the helix, as in the previous construction means are provided for lateral movement of the helix across the endless chain which support the main auxiliary pluckers and which at the same time impart free movement to the bine toward and away from the pluckers. The helix may be in the form of an endless band which passes around the driving pulley mounted on a superstructure which may be swung in the manner described.

I claim:

1. A hop plucking apparatus comprising means for holding a hop plant, plucking means adapted to engage the hop plant, means for imparting relative movement between the holding means and plucking means in the direction of the length of the plant, which plucking means comprises a helical tension spring anchored at opposite ends to supporting arms and extending transversely to the direction of said movement, and a supporting wire extending through the helical tension spring and connected to said arms which helical tension spring has its convolutions spaced apart so as to permit the entry of the stalks of the hop flowers but not the stems of the plant.

2. A hop plucking apparatus comprising means for holding a hop plant, plucking means adapted to engage the hop plant, means for imparting relative movement between the holding means and plucking means in the direction of the length of the plant which plucking means comprises a rectilinearly-extending helical tension spring and in addition a plurality of tension springs and associated supports spaced apart so that portions of the additional springs extend at right angles to said rectilinearly extending spring and the convolutions of which springs are spaced apart so as to permit the entry of the stalks of the hop flowers, but not the stems of the plant.

3. A hop plucking apparatus comprising means for holding a hop plant, plucking means adapted to engage the hop plant, means for imparting relative movement between the holding means and plucking means in the direction of the length of the plant which plucking means comprise a plurality of pairs of plates spaced apart, the plates in each pair having lugs projecting from the edges thereof, a helical tension spring extending around the edges of each pair of plates and supported by said lugs, which springs have their convolutions spaced apart so as to permit the entry of the stalks of the hop flowers but not of the stems.

4. A hop plucking apparatus according to claim 3 wherein said plates as viewed at right angles to their faces are tapered shape.

5. A hop plucking apparatus according to claim 3 wherein a wire extends through each said helical tension spring and is anchored at its ends to said plates.

6. A hop plucking apparatus comprising means for holding a hop plant, plucking means adapted to engage the hop plant, means for imparting relative movement between the holding means and plucking means which plucking means and the means for imparting movement thereto comprises, an endless link structure having cross bars each of which has secured thereto a number of arms, which arms on alternate cross bars support between them a helical tension spring, a supporting wire extending through each said spring, which supporting arms on the other bars have secured to each of them a pair of plates having lugs projecting from the edges thereof, a second helical tension spring supported by the lugs and extending along the edges of the plates and a wire extending through each said second spring and secured at its ends to said plates and each of which springs has its convolutions spaced apart so as to permit the entry of the stalks of the hop flower, but not the stems of the plant.

References Cited in the file of this patent

UNITED STATES PATENTS 2,064,748     Hinds _____ Dec. 15, 1936

FOREIGN PATENTS 671,448     Great Britain _____ May 7, 1952